(12) United States Patent
Gupta et al.

(10) Patent No.: US 8,158,005 B1
(45) Date of Patent: Apr. 17, 2012

(54) FUNCTIONAL COMPOSITES FORMED FROM COLLOIDAL POLYMER PARTICLES WITH PHOTOCATALYTIC METAL OXIDE ($MO_x$) NANOPARTICLES

(75) Inventors: Vinay Gupta, Tampa, FL (US); Maya Trotz, Tampa, FL (US); Cecil Coutinho, Tampa, FL (US)

(73) Assignee: University of South Florida, Tampa, FL (US)

( * ) Notice: Subject to any disclaimer, the term of this patent is extended or adjusted under 35 U.S.C. 154(b) by 276 days.

(21) Appl. No.: 12/263,799

(22) Filed: Nov. 3, 2008

Related U.S. Application Data (60) Provisional application No. 61/001,637, filed on Nov. 2, 2007.

(51) Int. Cl.
*C02F 1/28* (2006.01)
*C02F 1/32* (2006.01)

(52) U.S. Cl. ... 210/668; 210/669; 210/734; 210/748.14; 210/763; 210/766

(58) Field of Classification Search .. 210/748.01–748.2, 210/660, 668, 669, 721, 729, 732, 733, 734, 210/763, 766; 502/170, 350
See application file for complete search history.

(56) References Cited

U.S. PATENT DOCUMENTS

| | | | |
|---|---|---|---|
| 5,130,031 A * | 7/1992 | Johnston | 210/748.04 |
| 6,919,029 B2 | 7/2005 | Meng et al. | |
| 2003/0136946 A1 | 7/2003 | Kumacheva | |
| 2005/0228099 A1 | 10/2005 | Bringley et al. | |
| 2005/0271578 A1 | 12/2005 | Terada et al. | |
| 2006/0257485 A1 | 11/2006 | Kumacheva | |
| 2007/0116955 A1 | 5/2007 | Chen et al. | |
| 2007/0199480 A1 | 8/2007 | Zhou et al. | |

OTHER PUBLICATIONS

Xia et al., "Synthesis and Light Scattering Study of Microgels with Interprenetrating Polymer Networks" Langmuir, 20, (2004), 2094-2098.*
Crowther et al. "Poly(NIPAM) microgel particle de-swelling: a light scattering and small-angle neutron scattering study" Coloides and Surfaces A: Physicochemical and Engineering aspects 152 (1999) 327-333.*
Dictionary definition of "colloid" from yourdictionary.com (obtained Nov. 2010).*

(Continued)

*Primary Examiner* — Joseph Drodge
*Assistant Examiner* — Lucas Stelling
(74) *Attorney, Agent, or Firm* — Robert Varkonyi; Smith & Hopen, P.A.

(57) ABSTRACT

Microcomposites comprising titanium dioxide (TiO2) nanoparticles embedded within cross-linked, thermally responsive microgels of poly(N-isopropylacrylamide) are disclosed. Interpenetrating linear chains of poly(acrylic acid) functionalize the nanoparticles for dispersal within the microgel framework. The microcomposites show rapid sedimentation, which is useful for gravity separation applications such as environmental remediation via photocatalytic degradation. The extent of loading of the TiO2 within the colloidal particles can be easily manipulated from 10% (weight) to a value as high as 75%. The microgel-titania composites showed rapid sedimentation, which is useful for gravity separation of these particles in photocatalytic applications. The settling of the microgel-titania composites occurred over minutes and was much faster than solid, impermeable spheres. As the content of TiO2 increased within the particles from 10% to 75%, the increased effective particle density led to significant decrease in the settling time from approximately 2200 seconds to approximately 100 seconds.

23 Claims, 9 Drawing Sheets

OTHER PUBLICATIONS

Shirai et al., "Graft polymerization of vinyl monomers from initiating groups introduced onto polymethylsiloxane-coated titanium dioxide modified with alcoholic hydroxyl groups" Progress in Organic Coatings 35 (1999) 217-224.*

Coutinho et al., "Formation and properties of composites based on microgels of a responsive polymer and TiO2 nanoparticles" Journal of Colloid and Interface Science 315 (Jun. 16, 2007) 116-122.*

Coutinho et al. "Synthesis and characterization of interpenetrating networks functionalized with nanoparticles of titanium dioxde" The 58th Southeast Regional Meeting (Nov. 1, 2006), abstract.*

Choi, H.; Stathatos, E.; Dionysiou. 2007. Photocatalytic TiO2 films and membranes for the development of efficient wastewater treatment and reuse systems. Desalination. 202: 199-206.

Coutinho, C.A.; Harrinauth, R.K.; Gupta, V.K. 2008. Settling characteristics of composites of PNIPAM microgels and TiO2 nanoparticles. Colloids and Surfaces A: Physicochem. Eng. Aspects. 318: 111-121.

Coutinho, C.A.; Gupta, V.K. 2007. Formation and properties of composites based on microgels of a responsive polymer and TiO2 nanoparticles. Journal of Colloid and Interface Science. www.sciencedirect.com.

Zhang et al. 1998. "Role of Particle Size in Nanocrystalline TiO2-Based Photocatalysts." J. Phys. Chem. B. vol. 102. pp. 10871-10878.

Coutinho et al. 2006. "Composite Materials for Use in Wastewater Remediation." IGERT Symposium 2006. Poster.

ACS Publications. 2006. "58th Southeast Regional Meeting." Chem. Eng. News. vol. 84. No. 40. pp. 58-60.

Walker et al. 2006. "Simple Colorimetric Quantification of TiO2 Content in Polymer-Nanoparticle Composites." SERMAC Symposium 2006. Poster.

Coutinho et al. 2006. "Synthesis and Characterization of Interpenetrating Networks Functionalized with Nanoparticles of Titanium Dioxide." Oral Presentation SERMACS Symposium.

Coutinho et al. 2006. "Composite Smart Materials for Use in Wastewater Remediation." IGERT Symposium.

Coutinho et al. 2006. "Composite Materials of Thermo-Responsive Polymer Networks and Inorganic Nanoparticles." AICHE Symposium. Poster.

Coutinho et al. 2006. "Composite Materials of Thermo-Responsive Polymer Networks and Inorganic Nanoparticles." AICHE Symposium Proceedings. pp. 1-5.

Coutinho et al. 2006. "Composite Materials for Use in Wastewater Remediation." FLAVS Symposium 2006. Poster.

* cited by examiner

Figure 6 ions FUNCTIONAL COMPOSITES FORMED
FROM COLLOIDAL POLYMER PARTICLES
WITH PHOTOCATALYTIC METAL OXIDE
($MO_x$) NANOPARTICLES

GOVERNMENT SUPPORT

This invention was made with government support under Grant No. EEC-0530444 and Grant No. CTS-0508309 awarded by the National Science Foundation. The government has certain rights in the invention.

CROSS REFERENCE TO RELATED APPLICATIONS

This application is a Non-Provisional Application of co-pending U.S. Provisional Application No. 61/001,637 filed Nov. 2, 2007, which is incorporated herein by reference.

BACKGROUND OF THE INVENTION

Titanium dioxide is a common and widely studied photo-catalyst due to its appealing attributes such as non-toxicity, chemical inertness and high photocatalytic activity. Since the first report of photocatalytic purification of water using titania in 1977, use of $TiO_2$ has been widely investigated in literature. The large band gap of $TiO_2$ (~3.2 eV) permits it to absorb photons in the UV region, which results in production of electron-hole pairs that migrate to the catalyst surface and participate in redox reactions with organic species. Upon doping with nitrogen or metal ions, $TiO_2$ shows photocatalytic activity under visible radiation, which increases its commercial viability manifold.

In recent years, there has been increased interest in the use of nanosized titania powders due to enhancements in photocatalytic activity. This enhancement results from changes in properties such as crystallinity, surface area for reaction, and density of surface groups like OH that accompany the fine size. Because separation of suspended fine particles from water has been a major obstacle, use of nanoparticles of titania in applications such as waste-water treatment have been limited. Strategies that have been investigated to address this obstacle include immobilization of titania particle onto planar substrates or reactor walls. However, the reduction in available surface area of the catalyst and the transport limitations to the surface can lead to diminished photocatalytic activity, thereby limiting the usefulness of these strategies.

Another approach has involved the synthesis of polymer-titania microcomposites. In one report, supercritical fluids were used to incorporate insoluble inorganic nanoparticles into organic networks (see B. Yue; Y. Wang; C. Y. Huang; R. Pfeffer; Z. Iqbal, *Journal of Nanoscience and Nanotechnology* 2007, 7, (3), 994-1000, and Y. Wang; Z.-H. Jiang; F.-J. Yang, *Materials Science & Engineering, B: Solid-State Materials for Advanced Technology* 2006, 128, (1-3), 229-233; which are incorporated herein by reference). However, the ensuing aggregation of the nanoparticles reduced the effectiveness of the microcomposite (see K. Matsuyama; K. Mishima; K. I. Hayashi; H. Matsuyama, *Journal of Nanoparticle Research* 2003, 5, (1-2), 87-95, also incorporated herein).

SUMMARY OF INVENTION

The invention, in its various embodiments, relates to a medium for purifying fluids, including consumable liquids particularly consumable liquids, by removing organic materials from the fluids by contacting the fluids with a combination of colloidal polymer particles and photocatalytic metal oxide (MOx) nanoparticles. The microcomposites of the invention operate at ambient temperatures, and do not require any special heating or cooling to reduce concentrations of contaminants.

Photodegradation of an organic dye was studied experimentally using novel polymer-titania microcomposites. These microcomposites were prepared from metal oxide ($TiO_2$) nanoparticles embedded within cross-linked, thermally responsive microgels (poly(N-isopropylacrylamide)) and contained interpenetrating linear chains of poly(acrylic acid). The inventive microcomposites settle more than a hundred times faster than freely suspended $TiO_2$ nanoparticles and are extremely useful for simple gravity separation of the photocatalyst in applications that employ titania nanoparticles.

Here, the inventors demonstrate the synthesis of the inventive microcomposites in aqueous media comprising of polymeric microgels loaded with Degussa™ P25 TiO2 nanoparticles. The inventors have also detailed the impact of titania loading as well as temperature of the suspension on the settling velocity of these organic-inorganic composite particles. The extent of loading of the TiO2 within the colloidal polymer particles is easily manipulated and particles with high (50-75%) mass fractions of titania could be prepared. The microgel-titania composites showed rapid sedimentation on the time scale of minutes. The invention, therefore, also includes the use of the microcomposites for gravity separation of contaminants. gravity separation of these particles in applications.

Kinetics of the photodegradation of methyl orange (MO), which was chosen as an example of organic contaminant, was facilitated by the microcomposites and evaluated by monitoring the changes in MO concentration using UV-Vis spectroscopy. The influence of pH of the solution, which impacts the interactions between the poly(acrylic acid) in the polymer microgels, the titania surface, and the MO adsorbate, is also shown. Degradation of MO using freely suspended titania was also conducted for comparison with the microcomposites. The impact of prolonged irradiation on the degradation of the polymeric component of the microcomposites was observed using UV-Vis spectroscopy and the resultant release of titania is characterized by sedimentation studies.

BRIEF DESCRIPTION OF THE DRAWINGS

For a fuller understanding of the invention, reference should be made to the following detailed description, taken in connection with the accompanying drawings, in which:

FIG. 1. TEM images of (A) freely suspended $TiO_2$ nanoparticles in aqueous media and (B) microcomposites. Inset shows a digital photograph illustrating that the microcomposites settle readily under gravity while the titania nanoparticles remain suspended.

FIG. 2. (A) Changes in turbidity due to sedimentation of the microcomposites (squares) and $TiO_2$ nanoparticles (circles) at a pH of 2 (squares). The solid line is the fit to a mathematical model while the dashed line is drawn as a guide to the eye. (B) Distribution of settling velocity of freely suspended titania (solid lines) and the microcomposites (dashed lines) at three different pH values. No distribution is shown for the free titania nanoparticles at pH of 2 as the particles do no settle.

FIG. 3. (A) Absorbance spectra of MO degradation in solutions containing microcomposites (200 ppm $TiO_2$) at a pH of 2 (inset: canonical structures of MO at the corresponding pH) (B) Absorbance spectra of MO degradation in solutions containing microcomposites (200 ppm $TiO_2$) at a pH of 6.5 (inset: canonical structures of MO at the corresponding pH)

FIG. 5. Turbidity measurement as a function of time reflecting sedimentation in a solution of the microcomposites at pH 6.5 (A) and pH 2 (B) after the microcomposites have been irradiated with UV light for different durations. The first 1000 seconds are shown for clarity as the long time settling behavior of microcomposites and free titania is already interpreted in FIG. 2B. (C) Optical absorption from the oligomeric species present in the supernatant solution after microcomposites have been irradiated for different durations. The curves correspond to pH 2 (circles) and pH 6.5 (squares) and the optical signal is shown a fraction of the plateau value obtained at long times. The solid lines are drawn as a guide to the eye. Arrow indicates the typical times at which significant changes in settling were observed in parts (A) and (B). (D) Photodegradation kinetics at a pH of 2 using freshly prepared microcomposites (circles) and reformed microcomposites (squares) formed by recovering bare TiO2 nanopartciles from an aqueous dispersion.

DETAILED DESCRIPTION OF THE PREFERRED EMBODIMENT

The invention includes polymer-metal oxide microcomposites that show rapid sedimentation in aqueous dispersions and uses therefore. The photocatalytic behavior of the microcomposites was compared with freely suspended photocatalyst at acidic and near neutral conditions using the photodegradation of a model organic dye, methyl orange (MO). The reaction rate was found to be identical under acidic conditions while the freely suspended titania showed faster rate kinetics near neutral conditions. The microcomposites showed rapid sedimentation with settling velocities nearly 100 times faster than the freely suspended photocatalysts at both pH values. The invention, therefore, also includes the use of the inventive microcomposites in applications such as wastewater remediation and their use for recovering free MOx nanoparticles from a suspending fluid.

Functional materials with photocatalytic properties can be produced by providing a coating liquid containing a photocatalytic metal oxide (or a precursor of the photocatalytic metal oxide), coating a substrate with the coating liquid, and drying or sintering the coating. For example, as disclosed in Japanese Patent No. 2,517,874, a titania sol prepared from a titanium alkoxide and an alcoholamine or a sol prepared by dispersing particles of $TiO_2$, ZnO, $SrTiO_3$ or the like in an aqueous solvent has been coated onto the surface of a substrate followed by drying or sintering.

Although many of the embodiments discussed herein incorporate $TiO_2$ as a photocatalyst, the use of any photocatalyst is contemplated and such substitution would be within the ability of the skilled artisan. The term "photocatalyst," as used herein, refers to a material which, upon exposure to light (excitation light) having higher energy (i.e., shorter wavelength) than the energy gap between the conduction band and the valence band of the crystal, can cause excitation (photoexcitation) of electrons in the valence band to produce conduction electrons and holes. A photocatalytic inorganic oxide, for example, decomposes an organic compound through a redox reaction, or come to have a very high level of hydrophilicity as a result of adsorption of water molecules in atmosphere. According to a preferred embodiment of the present invention, the photocatalyst is a metal oxide that is doped or un-doped and selected from the group consisting of $TiO_2$, $ZrO_2$, ZnO, $SiO_2$, $SnO_2$, $SrTiO_2$, $WO_3$, $Bi_2O_3$, $Fe_3O_4$, $Fe_2O_3$, and $V_2O_5$.

Metal Oxide Microcomposites

Figure 1A:
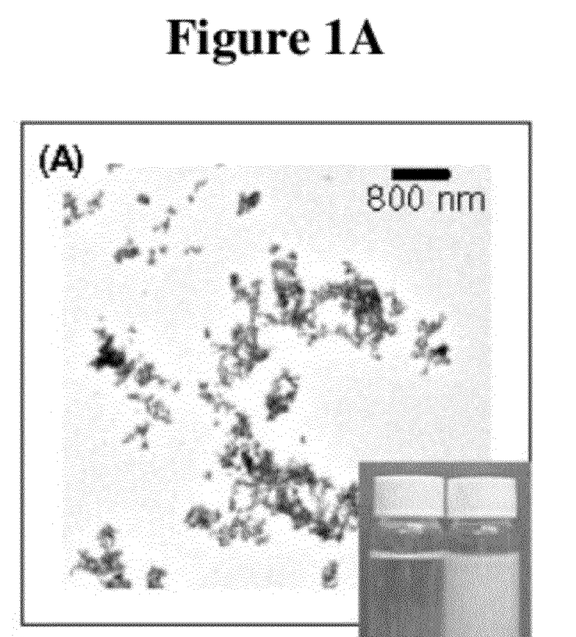
Figure 1B:
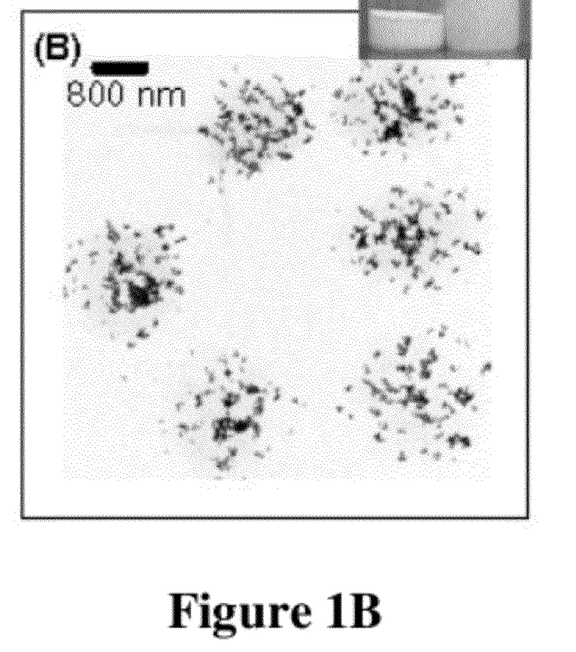

The microcomposites of a preferred embodiment comprise highly porous, cross-linked PNIPAM microspheres with interpenetrating chains of PAAc that allow easy and efficient loading of titania nanoparticles within the IP-microgels. The TEM images in FIG. 1 show the contrast between the freely suspended titania and microcomposites. Freely suspended titania is randomly displaced throughout the medium with no well defined arrangements, while in FIG. 1B the titania is localized onto the largely spherical IP-microgels. The surrounding areas are devoid of titania, which clearly shows the efficient mass transfer of the titania onto the IP-microgels.

The mass fraction of titania within the IP-microgels can be easily tailored by selection of the mixing ratios of the IP-microgel and TiO2 stock solutions. solutions. Table 1, shown in Example V, shows the different mass ratios for IP-microgel and $TiO_2$ used in this work. Synthesis of metal oxide microcomposites for use in a preferred embodiment are discussed in the examples below as well as C. A. Coutinho, V. K. Gupta, *Journal of Colloid and Interface Science* 315 (2007) 116-122, which is incorporated herein by reference.

The presence of titania within the microcomposites is also confirmed by the bulk transmission IR spectrum of the microcomposites (not shown) and its comparison with the spectra obtained for the PNIPAM microgels, IP-microgels containing PAAc, and titania. The broad absorbance of titania between 400-900 $cm^{-1}$ was observed in the microcomposites and was absent in the organic microgels that had no titania.

Photocatalysis

Photocatalysis can be typically divided into three stages: (1) production of electron/hole ($e^+$/$holes^+$) pairs by irradiation with light having photonic energy greater or equal to the existing band gap (~3.2 eV for titania), (2) migration of the charge carriers from the cystalline interior to the surface, and (3) redox interactions at the particle surface between the contaminant and the free $e^-$/$holes^+$ pairs that survived the migration. Mixed phase titania such as Degussa™ P25 (80% anatase and 20% rutile phase) has shown enhanced photocatalytic activity upon illumination compared to single crystalline phases. This enhancement is attributed to the ideal size of the titania nanoparticle, trace amounts of $Fe^{3+}$ dopant (charge separator) and for the most part the synergistic combination of the anatase and rutile phases that provides prolonged separation of the photogenerated electrons.

Equation 1 shows the $e_{-CB}$-$holes_{+VB}$ pair separation within the conduction and valence bands upon irradiation. It is broadly accepted that hydroxy radicals (OH.) are produced from the direct oxidation of $H_2O$, $OH_-$ ions (bulk solution) or terminal hydroxyl groups (catalyst surface) by photogenerated holes ($holes_{+VB}$) as shown in equations 2 and 3. Superoxide radicals often result from the interplay between the photogenerated electrons ($e_{-CB}$) and molecular oxygen. The addition of peroxides increases the occurrence of reaction 4 and the presence of hydroxyl radicals, thereby increasing the degradation kinetics.

$$TiO_2 + h\upsilon \rightarrow TiO_2 + e_{CB^-} + h_{VB}{}^+ \quad (1)$$

$$h_{VB}{}^+ + OH^- \rightarrow OH. \quad (2)$$

$$h_{VB}^+ + H_O \rightarrow OH. + H^+ \quad (3)$$

$$e_{CB}^- + O_2 \rightarrow O_2^- \quad (4)$$

Examining the adsorption characteristics of a model contaminant such as MO onto the TiO2 surface as a function of pH variations is pertinent to fully understanding the mechanism surrounding the degradation of organic contaminants Generally the observed pH dependence of the reaction rates of MO decomposition can be understood in terms of the adsorption of both the substrate molecule and hydroxyl ions onto the charged TiO2 surface as much of the degradation occurs on or near the titania surface rather than in the bulk medium. The surfaces of the metal or semi-conductor oxides are hydroxylated in the presence of water. Depending on the pH, these surfaces groups may add or abstract protons. The corresponding acid-base equilibria for titania can be written as follows:

$$TiOH + H^+ \leftrightarrow TiOH_2^+ \quad (5)$$

$$TiO^- + H^+ \leftrightarrow TiOH \quad (6)$$

Degradation of the MO can be explained in terms of the elementary mechanisms shown in equations 7-9. It can involve the direct reaction of the dye with photogenerated holes in a process similar to the photo-Kolbe reaction or oxidation through successive attacks by hydroxyl radicals or superoxide species. The hydroxy radical in particular is an extremely strong non-selective oxidant that has shown to lead to the partial or complete oxidation of many organic chemicals.

$$OH. + MO \rightarrow \text{colorless product} \quad (7)$$

$$h_{VB}^+ + MO \rightarrow \text{colorless product} \quad (8)$$

$$O_2^- + MO \text{ colorless product} \quad (9)$$

Termination of active species can also occur by the mechanisms detailed below.

Very small particle sizes (~10 nm) tend to lead to higher electron-hole recombination (equation 10) reducing the photocatalytic activity. However, the optimum size of Degussa™ P25 titania and its efficient electron transfer from the rutile to anatase phase, leads to increased charge separation that causes efficient photocatalytic reaction at the particle surface.

$$e_{CB}^- + h_{VB}^+ \rightarrow \text{heat} \quad (10)$$

$$HO._2 + OH. \rightarrow H_2O + O_2 \quad (11)$$

The degradation products of MO using Degussa™ P25 titania has been studied with many of the intermediates during the MO degradation process already identified. However, the use of polymer-titania microcomposites that have the potential for application in chemical oxidative processes remains unaddressed.

Methyl orange (MO) was used as a model contaminant to investigate degradation kinetics using the inventive microcomposites in aqueous suspensions. Kinetics of the photodegradation were evaluated by monitoring the changes in the MO concentration using UV-Vis spectroscopy. The photocatalytic behavior of functional microcomposites containing 65 wt % titania was compared against freely suspended titania. The influence of pH of the solution and the titania concentration was studied. The results indicated that pH of the solution changes the surface interactions between the poly (acrylic acid), titania, and MO and it determined the overall degradation kinetics of the chemical contaminants. Nearly identical reaction rate constants were observed in acidic solutions, while the freely suspended titania showed higher rate constant than the microcomposites at a neutral pH. Release of the titania from the microcomposites was observed under basic conditions. Complete degradation of the microcomposites was observed after prolonged (7-13 hours) of UV irradiation. However, the microcomposites were easily regenerated using by addition of the polymeric IP-microgels with no observed loss of photocatalytic activity.

Sedimentation of the Metal Oxide Microcomposites

Figure 2A:
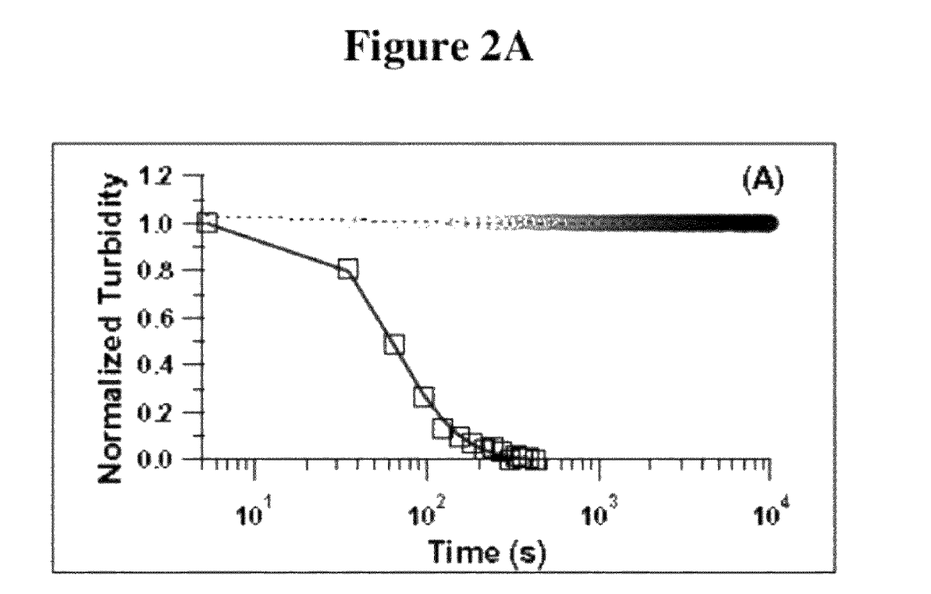

Rapid sedimentation of the microcomposites produces a favorable gravity separation that has significant potential for use in wastewater remediation as it can facilitate the recovery of the titania or other MOx nanoparticles. The inset of FIG. 1 shows the contrast between the settled microcomposites and the suspended titania nanoparticles in solution. Quantitatively, the settling of the microcomposites can be more fully characterized by studying the sedimentation behavior of the microcomposites via turbidometry and interpreting it in terms of the average settling velocity distribution. FIG. 2A shows the characteristic changes in normalized turbidity with time for a solution at pH 2 and indicates that the microcomposites settle within a few hundred seconds.

Rapid sedimentation at room temperature can be attributed to the reduced viscous drag experienced by the porous microcomposites during sedimentation (see C. A. Coutinho; R. K. Harrinauth; V. K. Gupta, Colloids and Surfaces, A: Physicochemical and Engineering Aspects 2008, 318, (1-3), 111-121, which is incorporated herein by reference). FIG. 2A shows that the freely suspended titania, in comparison, does not sediment at pH 2 but remains well-dispersed as indicated by the constant turbidity signal over several hours. The dispersion can be attributed to the strong electrostatic repulsion that exists between the positively charged titania particles in acidic solutions.

Figure 3A:
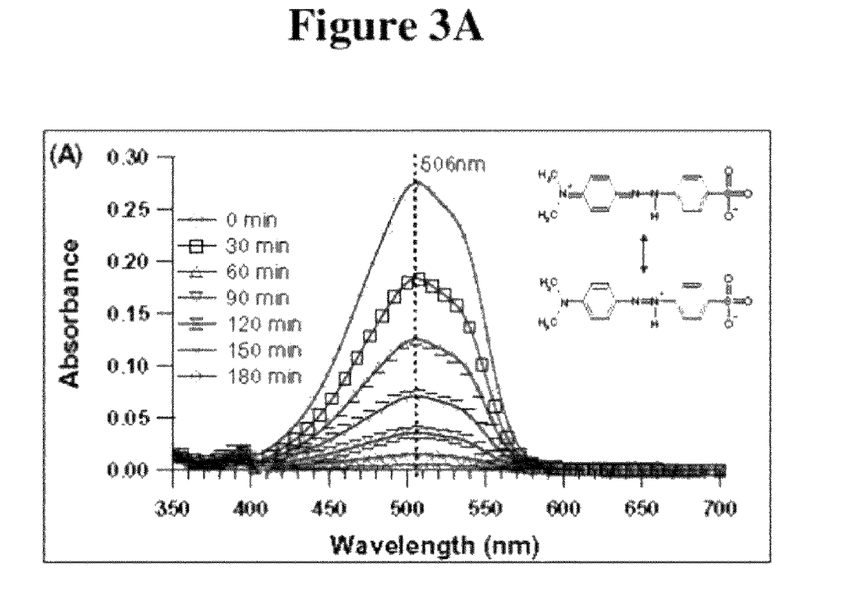
Figure 3B:
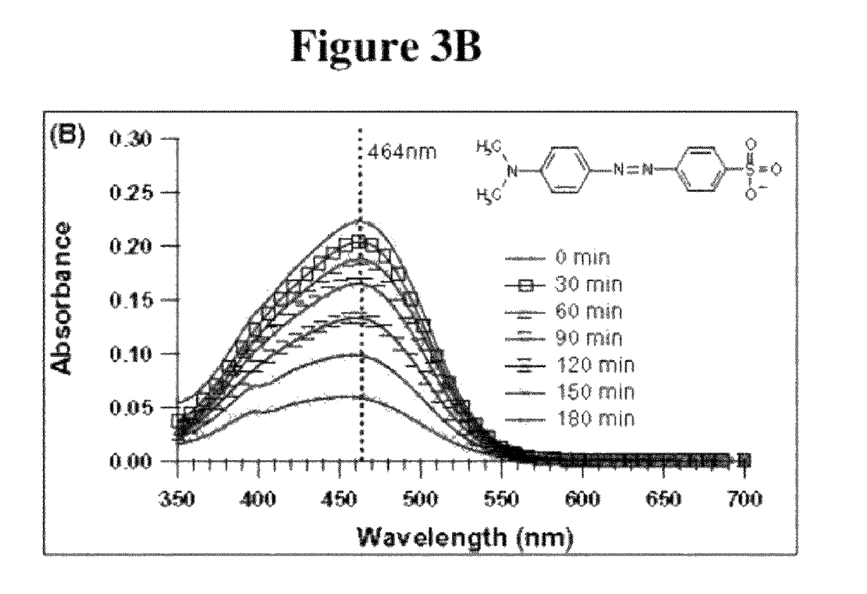

The decline in the measured turbidity signal shown in FIG. 3A can be transformed to yield a distribution of settling velocities (FIG. 3B). The microcomposites show a settling velocity distribution centered at ~0.1 cm/s for pH of 2. At this low pH, no settling velocity can be obtained for the freely suspended titania as it does not sediment. An increase in pH to 6.5 results in reduced electrostatic repulsion of the free titania nanoparticles and that results in aggregation with slow sedimentation at an average settling velocity of ~0.001 cm/s while the microcomposites still show a velocity distribution centered at ~0.1 cm/s. Thus, the microcomposites settle nearly a hundred times faster than the free titania particles at near neutral solution conditions, which clearly demonstrates the enhancement in the separation and recovery of photocatalyst using these novel polymer-titania materials.

Figure 2B:
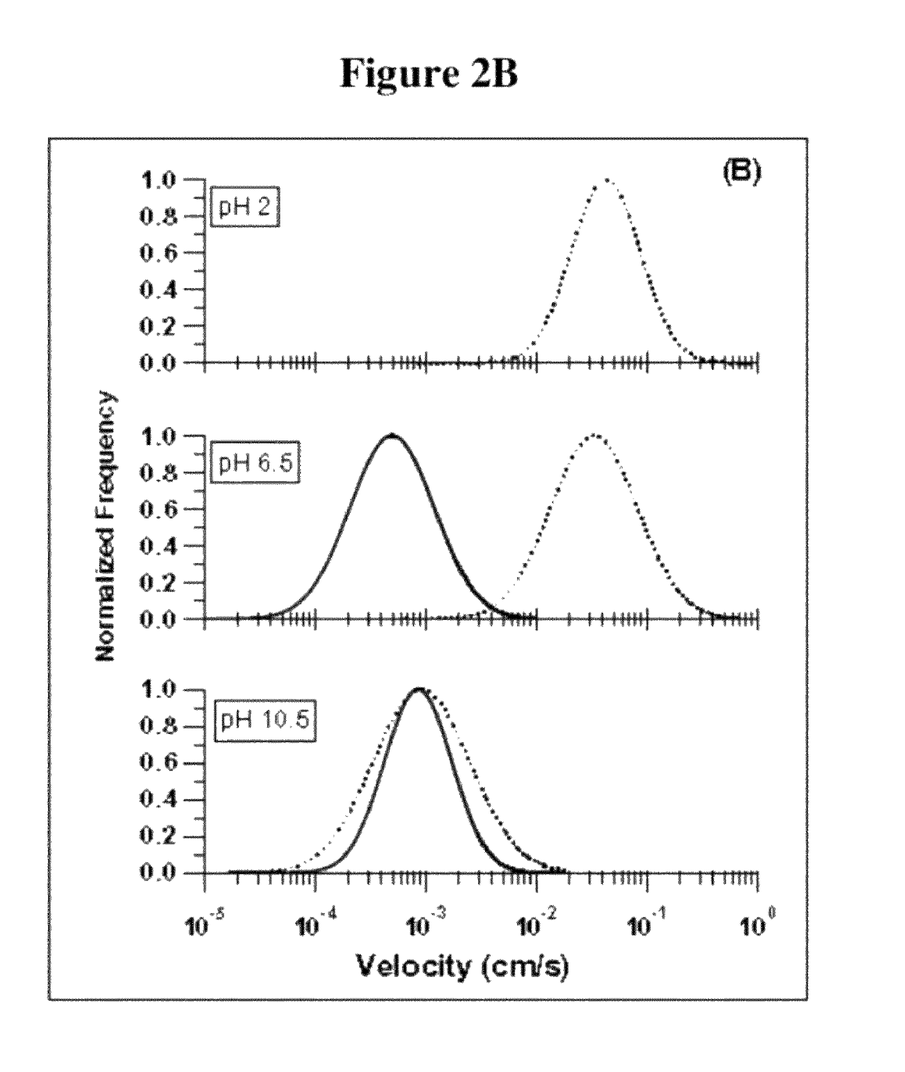

The bottom panel in FIG. 2B shows that when the pH of the solution is strongly basic (~10.5), the settling velocity obtained from characterizing a solution of microcomposites is almost identical to that of the freely suspended titania. The settling behavior is indicative of the release of titania nanoparticles from the IP-microgels at basic conditions, which is also observed by the naked eye. The release at a pH of 10.5 is attributed to the electrostatic repulsion originating from the negatively charged titania and deprotonated carboxylic acid groups of PAAc.

Figure 4:
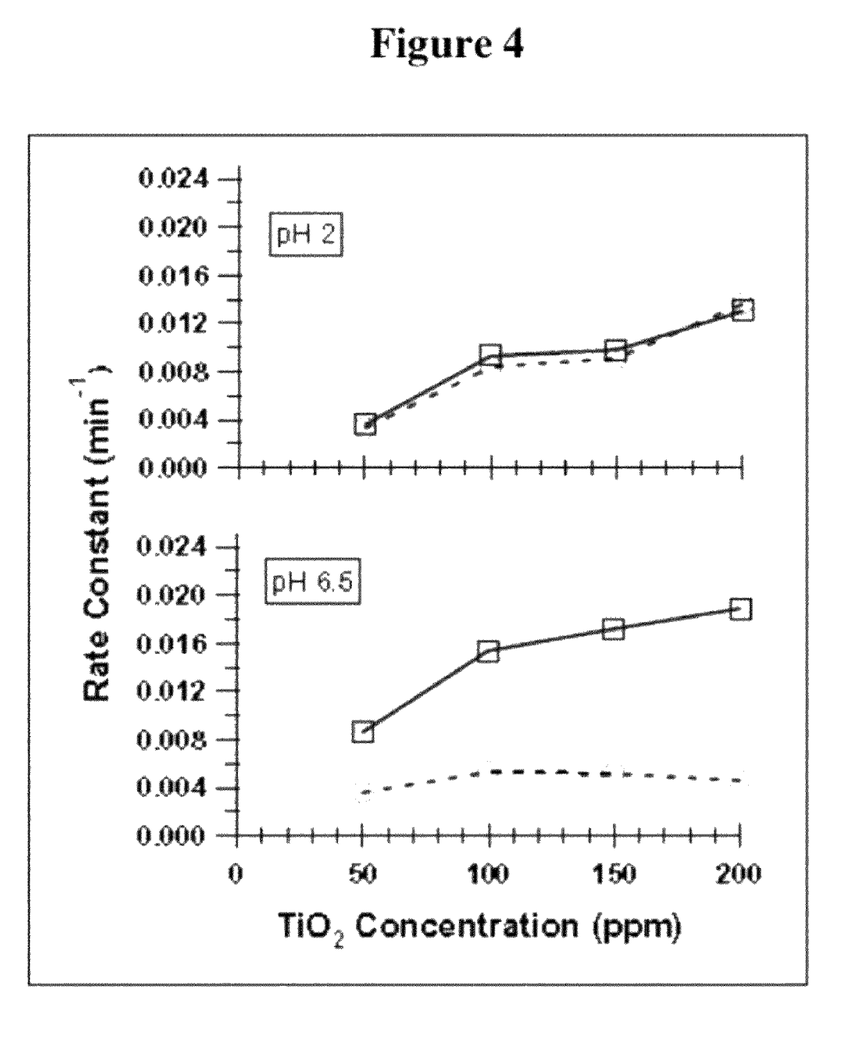
FIG. 4. Rate constants for the photocatalytic degradation of MO using freely suspended titania (squares) and microcomposites (circles) at a pH of 2 (A) and a pH of 6.5 (B). Lines are drawn as a guide to the eye.

For photodegradation experiments, the two different pH conditions (2 and 6.5) were chosen based on the results shown in FIG. 2. As a first step, it is important to clarify the effect of pH of the solution on MO. The initial spectra (at 0 min) in FIGS. 4A and 4B show the UV/Vis absorbance of MO above and below its $pK_a$ (~3.8). A significant peak shift is seen from 506 nm (pH~2) in FIG. 3A to 464 nm (pH ~6.5) in FIG. 3B. The change in structure of MO induced by the transition from a high to low pH is attributed to the increased delocalization of lone pair electrons on the azo group. The inset in FIG. 3A best describes this delocalization in the form of canonical structures of MO at acidic pH values. In addition to the peak shift seen in FIG. 3, there is also a 45% increase in the peak height of the MO absorbance when the pH lowered from 6.5 to 2. Absorbance is readily described by the Beer-Lambert law.

Since the concentration and absorbance path length are same, the canonical structures of MO, under acidic conditions, result in a larger molar extinction coefficient when compared to the negatively charged MO molecule at near neutral conditions. FIGS. 4A and 4B show that the peak absorbance of MO decreases as a function of time over 3 hours of irradiation as the titania in the microcomposites causes photodegradation of MO. The rate of change of absorbance of MO caused by photodegradation with either the microcomposite particles or the freely suspended titania are well described by a monoexponential curve suggesting that a pseudo-first-order reaction model can be used for describing the kinetic behavior of the photocatalysis. The MO concentration was held constant at 5 ppm. Using a modified Langmuir-Hinshelwood model, the rate of decolorization can be expressed as:

$$-\frac{dC}{dt} = r = \frac{kKC}{1+KC} \qquad (12)$$

Due to the initial low concentration of MO ($KC_0 \ll 1$), the $KC$ term in the denominator is generally neglected[41,42]. Integration of the above equation with the initial condition $C=C_0$ at $t=0$, and defining the apparent rate constant as $k_{app}=kK$ leads to the expected first order reaction equation:

$$\ln\left(\frac{C_0}{C}\right) = k_{app}t \qquad (13)$$

The apparent rate constant ($k_{app}$) was obtained directly using a regression analysis of the experimentally observed decline in the peak height of MO absorbance as a function of time. The control experiment, where MO in solution was irradiated in the absence of titania under similar conditions (pH 6.5, UV=3.5 mJ/cm$_2$), yielded a null rate constant and confirmed that MO degradation was achieved via photocatalysis alone.

In FIG. 4, the rate constant for the freely suspended titania is compared with that for the microcomposites across experiments performed with different amount of titania photocatalyst in the solution. Examining the rate kinetics of the freely suspended titania shows that increasing the concentration of the titania resulted in a faster decolorization of the MO at all pH values tested. This effect is well documented and attributed to the increased active sites available for MO degradation. Regarding the pH variation the results correlate well with that of Kansal and co-workers, who also reported faster degradation kinetics under basic conditions using freely suspended Degussa™ P25 titania. In general, the degradation of MO is faster at basic and neutral pH and slower in an acidic medium. This effect can be explained as follows: at a high pH, both the surface of the titania (ISP~6.5) and the MO are negatively charged. However, the presence of large quantities of OH— hydroxyl ions on the particle surface (as well as in the reaction medium) favors the formation of the oxidizing OH. radicals. Near a neutral pH, even though there is a reduction in the concentration of OH_ ions in bulk solution, the electrostatic repulsion between the titania surface (now relatively uncharged) and the MO is reduced, thereby favoring adsorption of the dye and its degradation. Lastly, in an acidic medium, although the adsorption of the MO is improved on the positively charged TiO$_2$ surface, the significant reduction in the concentration of the OH_ ions leads to a decrease in the rate constant as demonstrated experimentally at pH 2.

Figure 5A:
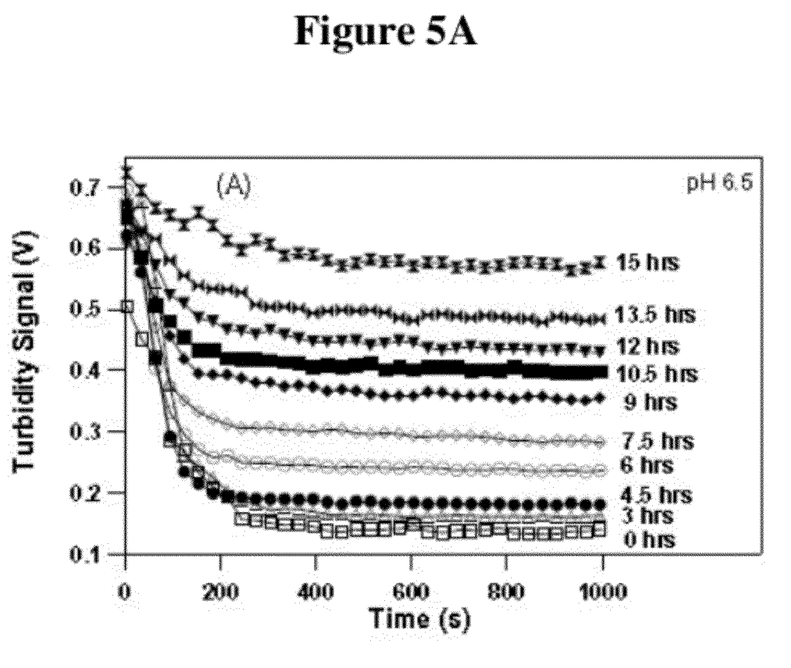
Figure 5B:
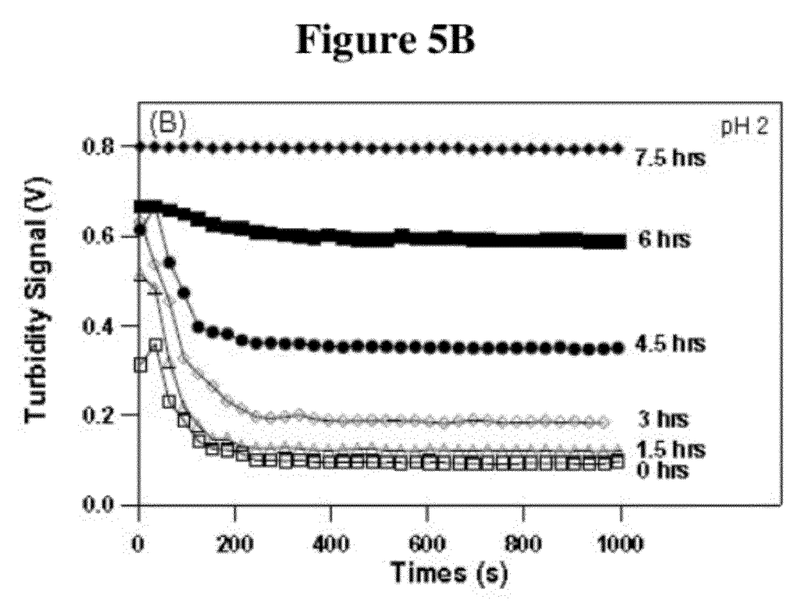

A number of significant observations emerge when comparing the photocatalytic performance of the freely suspended titania with the microcomposites in FIGS. 5A and 5B. Under acidic conditions, the photodegradation by the microcomposites and the free titania show nearly identical rate constant as well as the same variation with the concentration of titania. In contrast, near a neutral pH the photocatalytic degradation of MO using the microcomposites has a smaller rate constant and this remains largely unaffected even when the concentration of titania is increased. A closer look at the structure of the microcomposites can give some insight into these differences. The PAAc chains that interpenetrate the IP-microgel contain carboxylic acid groups that are mostly deprotonated above pH 4 and known to functionalize inorganic oxide surfaces. Near a neutral pH, photocatalytic degradation of MO using the microcomposites is minimal because modification of the oxide surface by deprotonated negatively charged carboxyl groups can result in the disruption of the adsorption of negatively charged hydroxyl species onto the titania surface due to electrostatic repulsion. With the number of oxidative species generated by the titania diminished, the photocatalytic oxidation reaction can be expected to be retarded and this is experimentally manifested as a lower reaction rate constant. However, at pH 2 the PAAc is protonated and the titania surface within the microcomposite remains primarily unhindered and available for the photocatalysis. As a result, the photocatalytic performance of both the microcomposites and the freely suspended titania were comparable. FIGS. 3B and 5B reveal that a trade-off exists when using the microcomposites since the photodegradation is slower at near neutral conditions but the settling is nearly a hundred times faster than the free titania particles.

Increasing the photocatalyst concentration from 50 to 200 ppm requires increasing the concentration of microcomposites. At acidic conditions, the concomitant increase in polymer fraction has little influence and the effect from increased titania surface sites dominates, which leads to faster photodegradation. At neutral pH conditions, the increase in the PAAc fraction balances the increase in titania and little change in the reaction rate constant can be observed. Although the reaction rate constant at neutral pH conditions is already small (~0.005 min$_{-1}$) when using the microcomposites containing 65 wt % content of titania, the invention also contemplates composites possessing less than 65% loading of titania for applications in which a reduced rate of photodegradation is desired.

Since the photocatalytic titania gives rise to oxidative species that can degrade the polymer chains, the inventors expect that the microcomposites will also decompose via photocatalysis over time. Consequently, the degradation of the microcomposites was studied using two separate approaches with no MO present in the solution. First, the sedimentation behavior of the microcomposites after various periods of UV irradiation was performed at the two pH conditions.

The settling velocity of the microcomposites is a function of the titania loading in the microgels. Therefore, any release of titania nanoparticles from the polymer particles should be expected to lead to reduced settling. Second, the scission of the polymer chains should lead to increase in the oligomeric segments present in the solution and so the inventors measured their concentration at regular time intervals during UV illumination.

FIG. 5A shows the signal from the turbidity detector during sedimentation of the microcomposites after various irradiation times at pH 6.5. It is evident that little change is observed in the sedimentation behavior even after 4.5 hours of UV illumination and most the particles in the settled rapidly within 1000 seconds, which suggests that the titania loading inside the microgels is largely constant and no significant loss of the nanoparticles is occurring. After 6 hours of irradiation, even though initial settling can be observed by the early decrease in turbidity of the solution, a residual signal after 1000 s indicates that the solution contains a suspended particulate concentration and that this is a contribution from the titania nanoparticles that have been released and are slowly sedimenting; the signal decays to zero over long times (cf FIG. 2B). As the time of irradiation increases beyond 6 hours, the steady upward shift in the residual signal indicates that the fraction of the released nanoparticles in the solution is growing with time of irradiation. FIG. 5B shows that at pH 2, a similar trend is observed with the release of titania being manifested in the sedimentation behavior of the microcomposites after only 4.5 hours of irradiation. The supernatant liquid remaining after 3 hours of UV irradiation of solutions at both pH 2 and 6.5 was also analyzed for titania using the quantitative spectroscopic technique and no measurable amount of titania was detected, which supports the interpretation of the plots in FIG. 5 that indicate release occurs primarily after 4.5 hours (at pH 2) or 6 hours (at pH 6.5). According to FIG. 5B, after approximately 6-7.5 hours of continuous irradiation at pH 2, most of the titania has been released and no settling is observed since the positively charged titania nanoparticles do not settle (cf FIG. 2A).

Figure 5C:
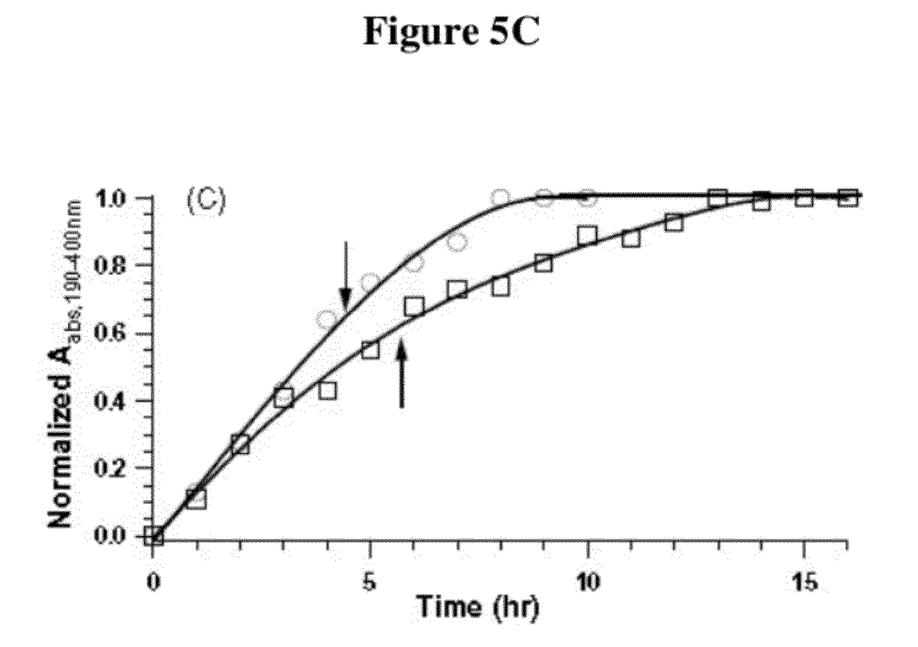

FIG. 5C reflects the increase in the oligomeric segments present in the supernatant that is obtained after centrifugation of samples drawn at regular time intervals during UV irradiation of a solution of the microcomposites alone. Absorption in the UVC region (190-400 nm) is typical of organic moieties of the fragmented polymeric segments that result from the cleavage of the IP-microgels during the photodegradation. FIG. 5C shows that integrated area of the absorption peak increases with time and becomes constant after several hours of irradiation. The data is again consistent with a physical picture of slow microcomposite degradation. At a pH 6.5, the measured absorbance reaches a plateau at ~13 hrs and at pH 2, the plateau value is reached ~8 hrs. Both of these times are also consistent with the turbidity results in FIGS. 5A and 5B that show few changes in settling after 10-12 hours and 6 hours, respectively. Interestingly, comparison of the results in FIGS. 5A and 5B with FIG. 5C also suggest that significant changes in settling, which should correspond to release of titania nanoparticles, only occur at times when a substantial percentage (~50-60% of the plateau value in FIG. 5C) of free oligomeric species are detected in solution.

The results in FIG. 5 also support the conclusions drawn form the photodegradation of MO shown in FIG. 4. At a pH 2, the degradation kinetics were much faster for MO and the same is true when the polymeric microgel is being degraded as evident by the comparison of sedimentation between FIGS. 5A and 5B or the comparison of oligomers in solutions after degradation that is shown in FIG. 5C. The results in FIG. 5 also indicate that the time for the degradation of the microcomposite particles is significantly longer than the time required for MO degradation (~3 hrs; cf FIG. 4).

Reformed Metal Oxide Microcomposites

Figure 5D:
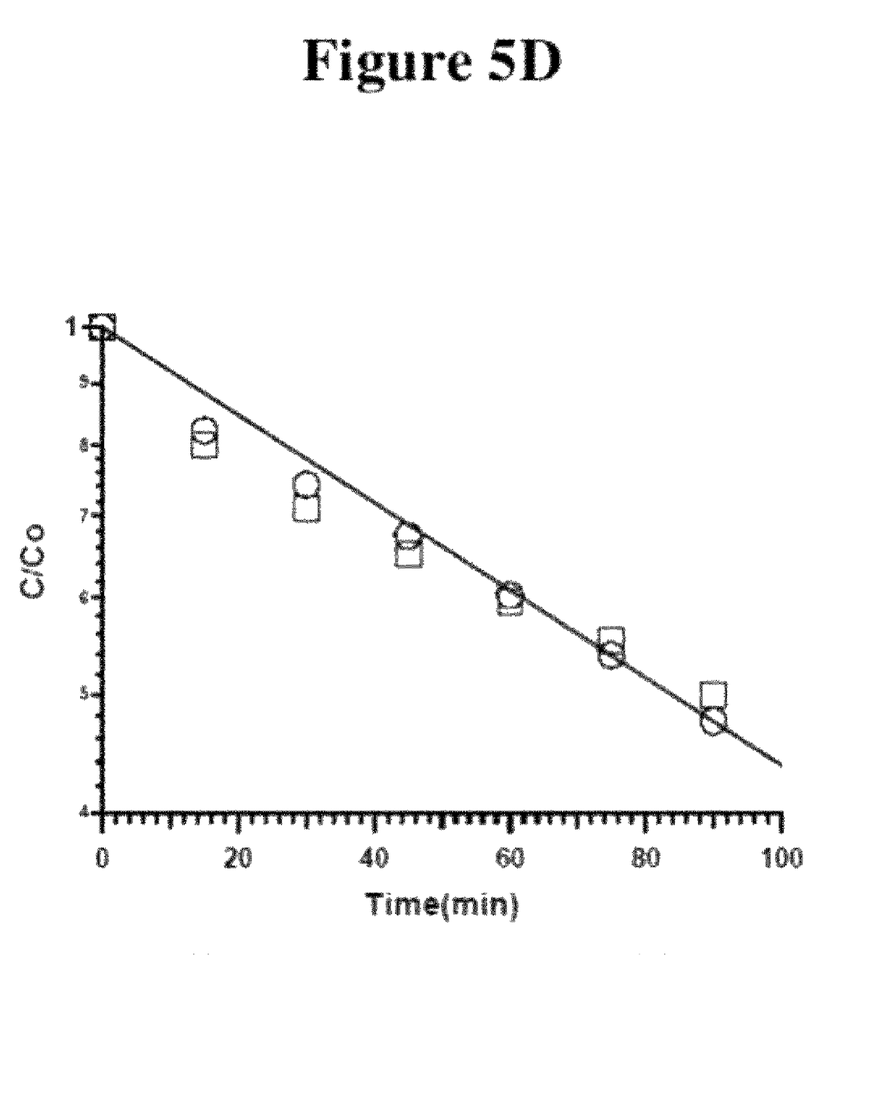

The use of nanoparticles of TiO2 is advantageous for photocatalysis but separation of the nanoparticles is difficult. Even though the cross-linked matrix of the colloidal polymeric particles showed degradation over long times, the titania that was released due to the microcomposite degradation could be easily re-captured using fresh polymer IP-microgels. FIG. 5D shows that these reformed microcomposites have virtually identical photocatalytic behavior as the original polymer-titania microcomposites, which shows that these materials can be easily regenerated and the photocatalyst can be recycled.

One of the advantages of these novel microcomposite materials is their ease of reformation. Following the long time degradation of the microcomposite as shown in FIG. 5, the titania nanoparticles are released in the aqueous solution. Addition of IP-microgel under acidic conditions was then used to quickly reform the microcomposites particles with a 65 wt % titania loading. These newly reformed microcomposites have the same settling behavior, as shown in FIG. 2, and photodegradation of the organic dye could be repeated using the reformed microcomposites.

When the photodegradation kinetics of MO using the reformed microcomposites are compared with the original results obtained from freshly prepared microcomposites, the regression analysis yields the same rate constant for both the original and reformed microcomposites as evident in FIG. 5D. Thus, the microcomposites are excellent materials for remediation processes as the titania photocatalyst can be easily re-used and/or recycled.

EXAMPLES

Unless otherwise noted, all chemicals purchased were reagent grade from Sigma-Aldrich (WI) and used without further purification. Water used in experiments was purified using an EasyPure UV system (Barnstead, Iowa). A 0.2 nm filter in this system removed particulate matter.

Example I

PNIPAM Microgel Synthesis

N-Isopropylacrylamide (2 g) was recrystallized from hexane and dried under vacuum prior to use. Surfactant free precipitation polymerization of NIPAM using N,N-methylenebisacrylamide (MBAA) (0.08 g) as a cross-linker was initiated using potassium persulfate (KPS) (0.04 g) in an aqueous medium at 75° C. The solution was purged with nitrogen gas for 45 min before polymerization. After a polymerization time of 5 hours, the reaction mixture was cooled down. The PNIPAM microgels formed were collected and purified by repeated centrifugation and washing with deionized water.

Example II

Peripheral Penetrating (PP) Microgel Synthesis

The PNIPAM microgels (1 g) formed in Example I were mixed with acrylic acid (1 ml) and dispersed in deionized water at 0° C. [22]. After the solution was purged with nitrogen, KPS (0.04 g) and the accelerator tetramethylethylenediamine (TEMED) (0.1 ml) were added. The reaction was allowed to proceed for 5 hours in the ice bath. The product was cleaned in a manner similar to the PNIPAM microgels above.

Example III

Interpenetrating (IP) Microgel Synthesis

Interpenetrating microgels were formed by the surfactant free precipitation polymerization of NIPAM (1 g) in an aqueous solution (200 ml) containing poly(acrylic acid) sodium salt (1.5 g, Mw~15,000 g/mol). MBAA (0.04 g) was used as the cross-linker and KPS (0.02 g) served as the initiator. Following purging with $N_2$, the reaction mixture was heated in an oil bath to 75° C. and the initiator was added. After polymerization for 5 hours, the product was cleaned by washing and centrifuging three times.

Example IV

Ultrafine $TiO_2$ Synthesis

A sol-gel technique was used wherein titanium tetraisopropoxide (3 ml) and 37% v/v HCl (0.5 ml) were added to 200 ml of absolute ethanol at 0° C. The resulting suspension was stirred for an additional 4 hours. The solvent was removed with a rotary evaporator and the $TiO_2$ nanoparticles re-suspended in deionized water.

Example V

Preparation of Polymer-Titanium Oxide ($TiO_2$) Microcomposites

Microspherical interpenetrating polymer gels (IP-microgels) were formed by precipitation polymerization of Nisopropylacrylamide (NIPAM) (1 g) that was cross-linked with N,N-methylenebisacrylamide (0.04 g) in an aqueous solution (200 mL) containing poly(acrylic acid) (PAAc) sodium salt (1.5 g, MW ~15,000 g/mol). The reaction mixture was purged with N2 for 1 hour, heated in an oil bath to 75° C. after which potassium persulfate (0.02 g) was added to initiate the 5 hours polymerization. The resulting IP-microgels were cleaned by washing, centrifuging and re-dispersing in deionized water three times.

Degussa™ P25 TiO2 was used in all photocatalytic experiments as the photocatalyst source. To obtain a homogeneous dispersion, TiO2 was suspended in deionized water at a pH of 1.5 to maintain a positive charge on the surface after which large aggregates were removed by centrifugation. Dynamic light scattering (DLS) using a Zetasizer Nano-S (Malvern, Pa.) showed that the remainder Degussa sample had a size distribution with a major peak at 71(±17) nm. Microcomposite formation was achieved by simply mixing the IP-microgels with the homogenized TiO2 suspension in a pre-determined ratio to create a tailored polymer-titania microcomposite. The interpenetrating PAAc chains lead to rapid and easy functionalization of the nanoparticles and the resulting microcomposites settle readily.

After sedimentation of the microcomposite, the supernatant was replaced with fresh deionized water. This washing procedure was repeated three times and the microcomposite suspension was then used for the photocatalytic experiments.

The concentration of titania (either in solution or within the polymer gels) was determined quantitatively by measuring the UV-Vis absorbance of the titanyl ion. The microcomposite samples, shown in Table 1, are designated C10, C25, C65 and C75 to indicate the approximate titania mass fraction in each sample particle. Sample 'C10S' refers to the composite containing ultrafine sol-gel synthesized TiO2.

TABLE 1

| Sample ID | % (mass) of $TiO_2$ Mixed | % (mass) of $TiO_2$ measured by UV-Vis Analysis |
| --- | --- | --- |
| C10 | 11.3 | 10.3 |
| C25 | 27.2 | 24.8 |
| C65 | 65.5 | 65.0 |
| C75 | 80.1 | 74.6 |
| C10S | 9.6 | 9.2 |

Composites of IP-microgels and $TiO_2$ were examined using TEM to visually determine the extent of $TiO_2$ loading. A drop of the sample solution was placed on a Formvar-coated Cu TEM grid that was examined using a FEI Morgagni 268D. For a quantitative analysis of $TiO_2$ loaded in the microgels, a known mass of the composite dried under vacuum was treated with boiling concentrated sulfuric acid and ammonium sulfate. A few drops of 30 wt % $H_2O_2$ were then added to the cooled solution to oxidize the degraded polymer and the solution reheated. An additional 5 ml of the $H_2O_2$ was added to develop the colorless titanyl ion into the intensely yellow colored peroxotitanyl ion $TiO_{2+}$. The peroxotitanyl ion formed shows an absorbance at 405 nm that was measured using a V-530 UV/vis spectrophotometer (Jasco, Md.). To assay the $TiO_2$ content in the composite from the measured absorbance, a linear calibration curve measured for known weights of $TiO_2$ was used.

Bulk FTIR spectrum of the microgels was measured using a Nicolet Magna-IR 860 spectrometer by pelletizing a small amount of dried gel with KBr. The polymer-titania microcomposites were qualitatively examined using TEM to visually determine the extent of titania loading and dispersion within the polymer matrix. A drop of the sample solution was placed on a Formvar-coated Cu TEM grid that was examined using a FEI Morgagni 268D.

Example VI

Sedimentation of Polymer-Titanium Oxide ($TiO_2$) Microcomposites

The settling features of the composite particles were obtained using a turbidimeter (model DRT 1000, HF instruments) in which the temperature of the sample was maintained by a circulating water bath. The light scattered at 90° to the incident beam was measured as a voltage signal with time. The top edge of the aperture was at 3.9 cm from the sample meniscus and the bottom edge at 5.0 cm. The sampling cylindrical tubes were 12 mm×75 mm in dimension and were closed at the top to prevent water loss from evaporation.

Suspensions of microgel-titania composites were prepared by diluting a concentrated stock solution with DI water to total volume of 5 cm3 and mass concentration, Cs≦0.5 mg/cm3. A typical experiment consisted of first equilibrating the metallic sample holder at a given temperature for 30-60 minutes. The sample tube containing the suspension was gently agitated for 5 minutes and then placed in the holder for 10-15 minutes, which was found to be adequate to reach the required temperature. At this point a sedimentation run was conducted by taking the sample tube out, shaking it vigorously and inverting it a few times to create a uniform suspension. The tube was then placed quickly back in the holder for data acquisition. Typically, 1000 points were acquired at an A/D sampling frequency of 1 kHz and the mean was recorded as a function of time. For the rapid settling composites, one point was recorded every 5 seconds. To improve the signalto-noise ratio for each sample, generally eight runs were performed and the measurements at corresponding times were averaged. For the composites that sediment in less than a few hundred seconds, the initial measurements entail some degree of settling during the 2-3 seconds taken for placing the sample tube back in the holder and decay of any bulk convection effects from the shaking Since the composites with 10 wt % $TiO_2$ take more than 2000 seconds to settle, the agitation step was performed after each run. In the measurements done at 15° C., the outside of the tube formed a thin condensate layer that had to be wiped prior to each run.

For comparison purposes, sedimentation was also performed at 25° C. with two types of silica spheres. One type was purchased from Bangs Laboratories (Indiana) with a nominal diameter of 3.21 μm. The manufacturer specified a standard deviation in size of 0.35 μm. A second, finer silica particle was synthesized in our laboratory by sol-gel hydrolysis of tetra-ethylorthosilicate with a diameter 0.45(±0.03) μm.

Example VII

Photocatalytic Degradation

Methyl orange was used a model contaminant to assess the photocatalytic behavior of the synthesized polymer-titania microcomposites. Aqueous solutions with 5 ppm of MO were evaluated for degradation. Microcomposites or free TiO2 nanoparticles were added such that the overall titania content in the solution was 50, 100, 150 or 200 ppm. The pH was adjusted using 0.1M HCl or 0.1M NaOH and degradation kinetics were evaluated at a pH of 2(±0.1), 6.5(±0.2) and 10.5(±0.1). Photocatalysis was performed under illumination using two commercially available 15 W Philips F15T8 blacklight fluorescent bulbs (model 392233) that have spectral energy distribution centered at 352 nm.

Figure 6:
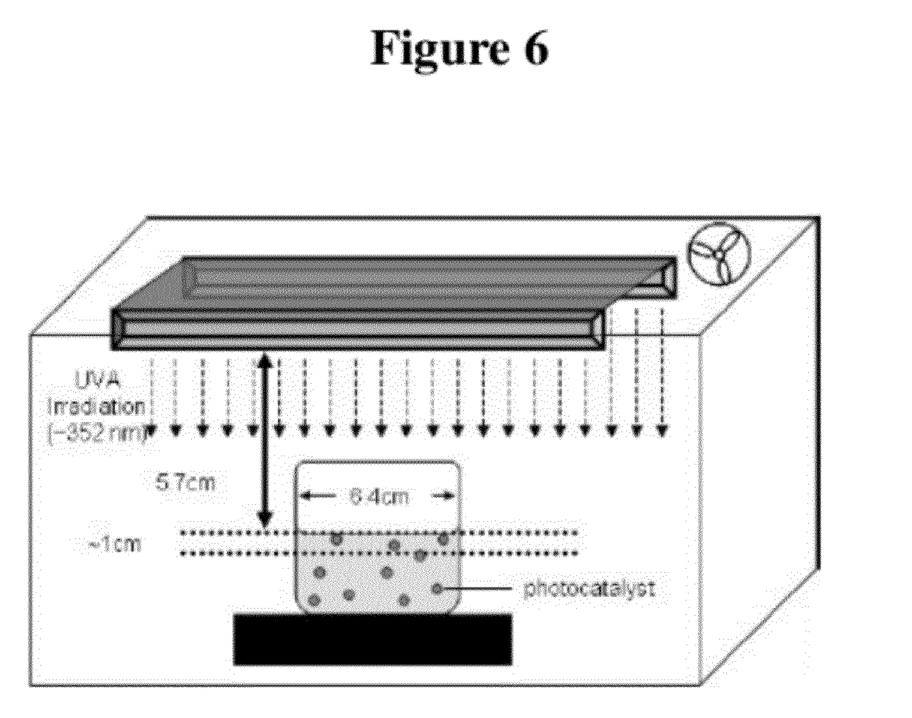
FIG. 6. Schematic of the experimental setup used for photocatalytic degradation (not drawn to scale).

The intensity of the radiation reaching the solution surface (3.5 mJ/cm2) was detected using a Chromaline UV Minder radiometer (UVM226) connected to a remote probe (UVM226S). The experimental setup for the degradation of the MO is shown in FIG. 6. The apparatus was kept inside a vacuum hood where a slight negative air pressure prevented any upsurge of $CO_2$ or $N_2$ above the reaction vessel that could occur due to the decomposition of the organics. It has been documented that much of the irradiation occurs within a few centimeters of the liquid surface (even at very low catalyst loadings). Consequently, the reaction was conducted under vigorous agitation to ensure uniform distribution throughout the reacting medium. Control experiments were performed by conducting UV irradiation without the addition of any catalyst. Negligible decolorization (<1%) of the MO was observed confirming that the degradation of MO predominately occurs by photocatalysis using titania rather than photolysis. Dark adsorption was conducted for at least three hours before irradiation for adsorption of MO onto the $TiO_2$ surface. Aliquots of 1.5 mL of the suspension were collected at regular intervals during the degradation experiments, centrifuged (10000 g, 30 mins) to completely remove any particles, and the peak absorbance was analyzed using a V-530 UV-V is spectrophotometer (Jasco, Md.).

The results reported herein demonstrate that the long wave UVA region near 350 nm can be used for photodegradation of chemical contaminants with the microcomposites without rapid decomposition of the polymeric matrix. Therefore, the invention also includes the use of the inventive microcomposites in large scale separations using gravity thickeners and centrifugal clarifiers.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method of removing an organic contaminant from an aqueous medium comprising
    contacting the aqueous medium with an oxidizing material comprising a plurality of photocatalytic microcomposite particles, where the microcomposite particles further comprise
        a poly(N-isopropylacrylamide) microgel polymerized into a particle;
        at least one interpenetrating linear chain of poly(acrylic acid) associated with the poly(N-isopropylacrylamide) microgel;
        a plurality of photocatalytic inorganic oxide particles attached to the surface and interior of the polymerized gel particle;
        wherein the photocatalytic inorganic oxide particles are immobilized on the surface and in the core of the poly(N-isopropylacrylamide) microgel particle by the at least one interpenetrating linear chain of poly(acrylic acid)
    irradiating the photocatalytic microcomposite particles with a wavelength sufficient to activate the inorganic oxide particles;
    allowing the photocatalytic microcomposite particles to settle;
    recapturing any released titania, further comprising
        adding at least one recycle particle to the aqueous medium, wherein the recycle particle consists essentially of
            a poly(N-isopropylacrylamide) microgel polymerized into a particle;
    at least one interpenetrating linear chain of poly(acrylic acid) associated with the poly(N-isopropylacrylamide) microgel; and
    allowing the released titania to contact the recycle particle.

2. The method of claim 1, wherein the photocatalytic inorganic oxide particles are selected from the group consisting of $TiO_2$, $ZrO_2$, $ZnO$, $SiO_2$, $SnO_2$, $SrTiO_2$, $WO_3$, $Bi_2O_3$, $Fe_3O_4$, $Fe_2O_3$, $V_2O_5$, and a combination thereof.

3. The method of claim 2, wherein the photocatalytic inorganic oxide particles are $TiO_2$, wherein the $TiO_2$ further comprises about 80% anatase phase and 20% rutile phase.

4. The method of claim 1, wherein the photocatalytic inorganic oxide particles are doped with a charge separator.

5. The method of claim 1, wherein the aqueous medium is between about 15 and 75° C. when the photocatalytic microcomposite particles are allowed to settle.

6. The method of claim 1, wherein the diameter of the microcomposite particles is between 0.3 μm and 0.8 μm for a temperature ranging from about 15 to 75° C.

7. The method of claim 1, wherein the poly(N-isopropylacrylamide) microgel particle further comprises about 48% poly(acrylic acid) by mass.

8. The method of claim 1, wherein the microcomposite particles comprise between about 10 and 75% photocatalytic inorganic oxide particles by weight.

9. The method of claim 1, wherein the pH of the aqueous medium is between about 2 and 6.5.

10. A method of removing an organic contaminant from an aqueous medium comprising
- contacting the aqueous medium with an oxidizing material comprising a plurality of photocatalytic microcomposite particles, where the microcomposite particles further comprise
  - a poly(N-isopropylacrylamide) microgel polymerized into a microspherical particle;
  - a plurality of poly(acrylic acid) interpenetrating chains dispersed through the polymerized poly(N-isopropylacrylamide);
- a plurality of inorganic oxide particles attached to the surface and interior of the polymerized gel particle, where the microspherical particle is thermally responsive;
- irradiating the photocatalytic microcomposite particles with a wavelength sufficient to activate the inorganic oxide particles;
- allowing the photocatalytic microcomposite particles to settle;
- recapturing any released titania, further comprising
  - adding at least one recycle particle to the aqueous medium, wherein the recycle particle consists essentially of
    - a poly(N-isopropylacrylamide) microgel polymerized into a particle;
    - at least one interpenetrating linear chain of poly(acrylic acid) associated with the poly(N-isopropylacrylamide) microgel; and
  - allowing the released titania to contact the recycle particle.

11. The method of claim 10, wherein the aqueous medium is between about 15 and 75° C. when the photocatalytic inorganic oxide particles are allowed to settle.

12. The method of claim 10, wherein the diameter of the poly(N-isopropylacrylamide) microgel polymerized into a microspherical particle is between 0.3 μm and 0.8 μm at a temperature between about 15 and 75° C.

13. The method of claim 10, wherein the photocatalytic inorganic oxide particles are immobilized on the surface and in the core of the poly(N-isopropylacrylamide) microgel particle by the interpenetrating linear chains of poly(acrylic acid).

14. The method of claim 10, wherein the microspherical gel comprises about 48% poly(acrylic acid) by mass.

15. The method of claim 10, wherein the oxidizing material comprises between about 10 and 75% photocatalytic inorganic oxide particles by weight.

16. The method of claim 10, wherein the pH of the aqueous medium is between about 2 and 6.5.

17. The method of claim 10, wherein the photocatalytic inorganic oxide particles are selected from the group consisting of $TiO_2$, $ZrO_2$, $ZnO$, $SiO_2$, $SnO_2$, $SrTiO_3$, $WO_3$, $Bi_2O_3$, $Fe_3O_4$, $Fe_2O_3$, $V_2O_5$, and a combination thereof.

18. The method of claim 17, wherein the photocatalytic inorganic oxide particles are $TiO_2$, wherein the $TiO_2$ further comprises about 80% anatase phase and 20% rutile phase.

19. The method of claim 10, wherein the photocatalytic inorganic oxide particles are doped with a charge separator.

20. A method of removing an organic contaminant from an aqueous medium comprising:
- contacting the aqueous medium with an oxidizing material comprising a plurality of microcomposite particles, where the microcomposite particles further comprise
  - a poly(N-isopropylacrylamide) microgel having interpenetrating linear chains of poly(acrylic acid) polymerized into a particle;
  - a plurality of $TiO_2$ particles immobilized to the surface and interior of the polymerized gel particle;
  - wherein the oxidizing material comprises between about 10 and 75% $TiO_2$ particles by weight;
- irradiating the photocatalytic microcomposite particles with a wavelength sufficient to activate the inorganic oxide particles;
- allowing the photocatalytic microcomposite particles to settle at a temperature between about 15 and 75° C.;
- adding a recycle particle to the aqueous medium, wherein the recycle particle consists essentially of
  - a poly(N-isopropylacrylamide) microgel polymerized into a particle;
  - at least one interpenetrating linear chain of poly(acrylic acid) associated with the poly(N-isopropylacrylamide) microgel; and
- allowing released titania to contact the recycle particle.

21. The method of claim 20, wherein the pH of the aqueous medium is between about 2 and 6.5.

22. The method of claim 20, wherein the plurality of $TiO_2$ particles are doped with a charge separator.

23. The method of claim 20, wherein the $TiO_2$ further comprises about 80% anatase phase and 20% rutile phase.

* * * * *